United States Patent [19]
Loesch

[11] 4,122,717
[45] Oct. 31, 1978

[54] RETAINING CLIP FOR FLOW METER
[75] Inventor: Stanley B. Loesch, Duncan, Okla.
[73] Assignee: Halliburton Company, Duncan, Okla.
[21] Appl. No.: 856,476
[22] Filed: Dec. 1, 1977
[51] Int. Cl.² ............................................. G01F 1/115
[52] U.S. Cl. ................................................. 73/231 R
[58] Field of Search ........................... 29/156.8 R, 526; 73/231R; 415/189, 190, 210

[56] References Cited
U.S. PATENT DOCUMENTS

| 3,097,529 | 7/1963 | Jackson et al. | 73/231 |
| 3,623,835 | 11/1971 | Boyd | 73/231 |
| 3,999,885 | 12/1976 | Harris et al. | 73/231 |

*Primary Examiner*—Herbert Goldstein
*Attorney, Agent, or Firm*—John H. Tregoning; James R. Duzan

[57] ABSTRACT

A fluid flow measuring device comprising a hollow cylindrical housing having a plurality of recessed areas extending about a portion of the interior surface of the housing and through only a portion of the thickness of the housing; fluid flow straightening means having a plurality of recessed areas in the exterior surface of the fluid flow straightening means; a plurality of fastening means, each fastening means having a portion inserted in the area formed when a recessed area in the housing and a recessed area in the fluid flow straightening means are aligned while the remaining portion of the fastening means substantially conforms to the exterior surface of the fluid flow straightening means thereby fastening the fluid flow straightening means to the housing; and means for measuring the flow of fluid through the housing. Alternately, the housing may have a continuous recess about the interior surface in place of the plurality of recessed areas.

37 Claims, 6 Drawing Figures

RETAINING CLIP FOR FLOW METER

This invention relates to the construction of a turbine flow meter and more particularly to the retaining means for the flow straightening means in the turbine flow meter.

Typical prior art turbine flow meters are constructed having the turbine rotor disposed in line and between vane type flow straighteners or flow directing elements. A common method of retaining the flow straighteners or flow directing elements in the flow meter housing is to use a snap ring which mates in a groove or channel in the flow meter housing and is interposed between the ends of the flow straightening vanes.

While this is a very convenient retaining method, since the snap ring must protrude into the flow path to mate with the ends of the flow straightening vanes or flow directing elements, the snap ring creates a flow disturbance in the flow path of the flow meter. In turn, the flow disturbance created by the snap ring extending into the flow path of the flow meter affects the accuracy of flow measurement, particularly under high mass flow conditions through the flow meter.

Other common methods of retaining the flow straightening vanes in a flow meter housing include machining a step or slot in the flow meter housing into which the ends of the straightening vanes are received, using a sleeve installed in the flow meter housing to prevent movement of the straightening vanes or using a set screw extending through flow meter housing into the end of a straightening vane. While these are acceptable methods of mounting the straightening vanes within the flow meter housing, they are generally expensive to manufacture, requiring close machining tolerances of the parts, they can result in difficult assembly procedures or in the case of a set screw, they may result in leakage through the flow meter housing.

In contrast to the prior art, the present invention retains the flow straightening vanes within a housing utilizing deformable clips to secure the ends of the straightening vanes within the housing. By retaining the ends of the straightening vanes in a housing utilizing deformable clips, the straightening vanes are easily assembled in the housing, close machining tolerances are not required for the parts and little flow path disturbance results from the clips extending into the flow path thereby improving the accuracy of flow measurement of the flow meter.

The foregoing advantages and the preferred embodiments of the invention will be better understood from the foregoing specification taken in conjunction with the accompanying drawings wherein.

Figure 1:
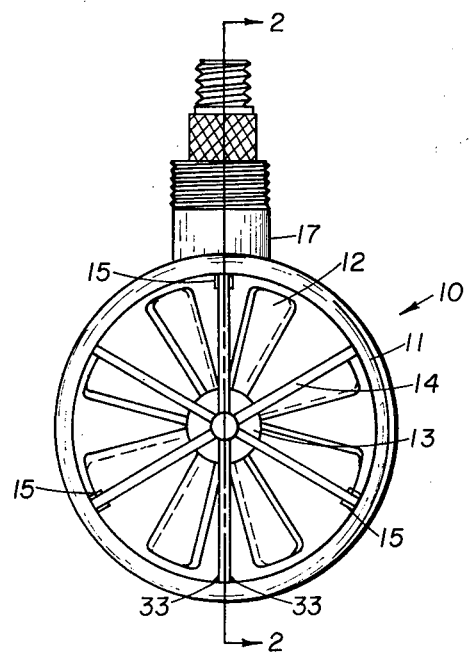
FIG. 1 is a front view of the invention.

Referring to FIG. 1, the invention is shown in its preferred embodiment. A turbine flow meter 10 is shown comprising a hollow cylindrical housing 11, a turbine rotor 12 and flow straightening member 13 having straightening vanes 14 thereon. As shown, the flow straightening member 13 is held in position in the housing 11 by means of clips 15 engaging the outer ends of the vanes 14 and the inner periphery of the housing 11.

As further shown in FIG. 1, axial beads of weld material 33 are formed on the interior surface of the housing 11 on either side of a vane 14 to prevent the flow straightening means 13 from rotating when installed in the housing 11. Alternatively, a pair of pins (not shown), each pin being positioned in a bore extending at an angle into the housing 11 on either side of a vane 14, may be used to prevent the flow straightening means 13 from rotating when installed in the housing 11.

Figure 2:
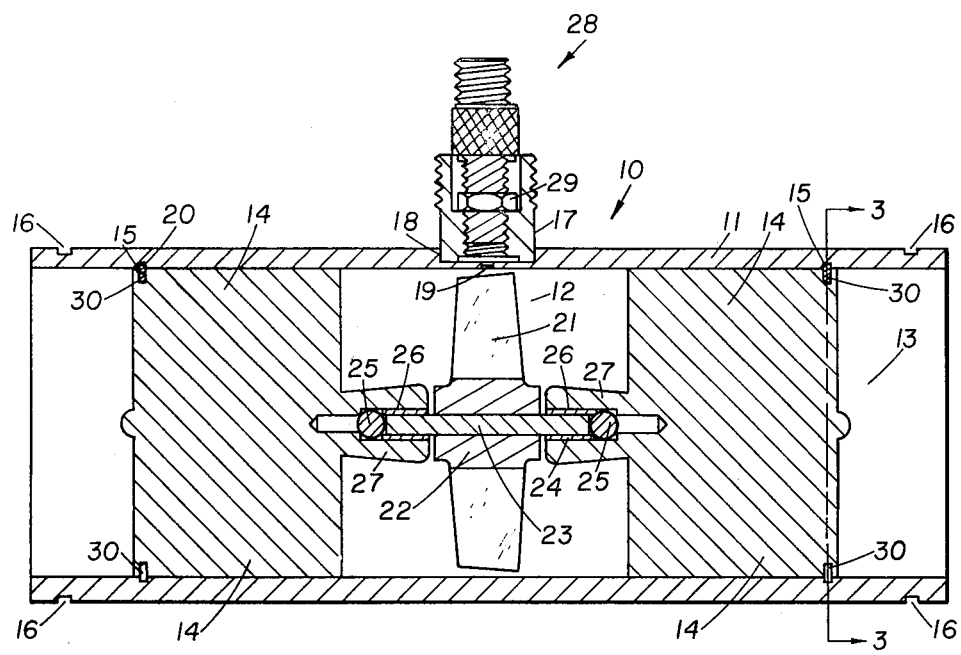
FIG. 2 is a cross-sectional view of the invention taken along line 2—2 of FIG. 1.

Referring to FIG. 2, the turbine flow meter 10 is shown in cross-section. The housing 11 is formed with each end portion having an external groove 16 therein to facilitate connecting the turbine flow meter 10 in a conduit (not shown). Although shown as grooved, alternatively, the end portions of the housing 11 may be flanged, threaded, etc. to allow connection with any type conduit. The housing 11 is also formed with an electrical pickup housing 17 thereon. The electrical pickup housing 11 is secured in a recess 18 in the housing 11 and is in fluid communication with the interior of the housing 11 by means of aperature 19. The pickup housing 17 may be secured to the housing 11 by any suitable means, such as by welding or interference fit which requires pressing of the pickup housing 17 into the housing 11. The exterior of the pickup housing 17 may be threaded to mate with any suitable electrical connector.

The housing 11 is further formed having either an annular channel 20 or a plurality of arcuate recesses 20' therein adjacent each end of the housing 11 about the inner periphery thereof into which a portion of the tabs 15 extend.

Installed in the housing 11 is a turbine rotor 12 having blades 21 and a hub 22. The turbine rotor 12 is supported on a shaft 23 which, in turn, is journaled in the flow straightening means 13. Each end of the shaft 23 rides in a bearing 24 and abuts a ball 25, both of which are installed in a bore 26 in the rotor end 27 of the flow straightening means 13.

As further shown in FIG. 2, an electrical pickup 28 threadedly engages the pickup housing 17 on the housing 11. The pickup 28 is secured from loosening in the pickup housing 17 by means of a suitable locknut 29. Any suitable commercially available electrical pickup which is capable of generating electrical impulses as a blade 21 of the rotor 12 passes by may be used.

Figure 3A:
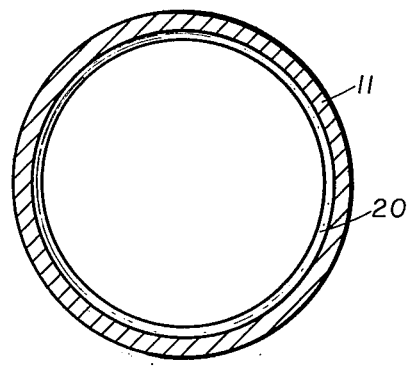
FIG. 3A is a cross-sectional view along line 3—3 of FIG. 2 with the flow straightening means not shown, showing only the flow meter housing.

Referring to FIG. 3A, the annular channel 20 is shown in cross-section in the housing 11. As shown, the annular channel 20 extends about the inner periphery of the housing 11 and into which a portion of the tabs 15 extend.

Figure 3B:
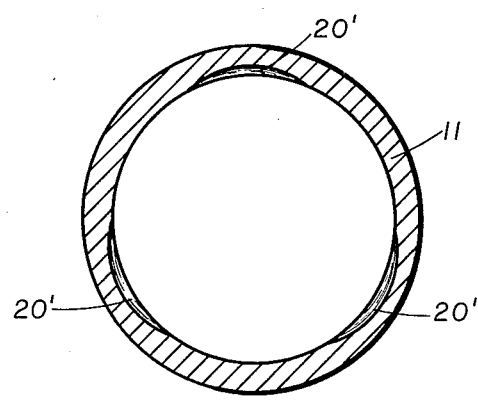
FIG. 3B is an alternative cross-sectional view along line 3—3 of FIG. 2 with the flow straightening means not shown, showing only the flow meter housing.

Referring to FIG. 3B, the housing 11 is shown having a plurality of arcuate recesses 20' located about the inner periphery thereof into which a portion of the tabs 15 extend. The arcuate recesses 20' about the inner periphery of the housing 11 may vary in number from one to a number equal to the number of vanes 14 on the flow straightening means 13. By utilizing a plurality of arcuate recesses 20' rather than a continuous annular channel 20, when installed, the flow straightening means 13 are precluded from both axial and rotational movement with the housing 11, thereby making the use of annular beads of weld material 33 or the use of roll pins to preclude the flow straightening means 13 from rotating when installed in the housing 11 optional.

Figure 4:
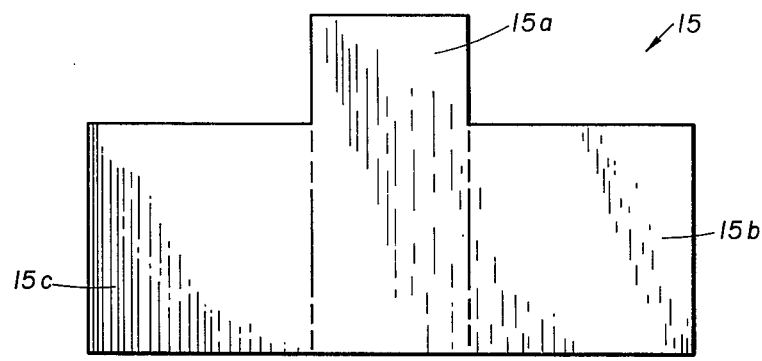
FIG. 4 is a planform view of the deformable clip retaining the flow straightening vanes within the housing.

Referring to FIG. 4, a tab 15 is shown in planform. The tab 15 comprises a center portion 15a, a side portion 15b and a side portion 15c. When installed in the turbine flow meter 10, the upper portion of center portion 15a is installed in the annular channel 20 or arcuate recesses 20' in the housing 11 with the lower portion of the center portion 15a being installed in the slot 30 in the outer end of the vane 14 of the flow straightening means 13. The side portions, 15b and 15c, when installed, are deformed into engagement with the sides of a vane 14 of the flow straightening means 13 or are deformed to parallel the sides of a vane 14. Since the side portions, 15b and 15c, are either engaging the sides of a vane 14 or paralleling the sides of a vane 14, very little distrubance to the flow through the turbine flow meter 10 occurs, thereby improving the accuracy of flow measurement by the turbine flow meter.

Any desired number of tabs may be used to secure the flow straightening means 13 in position in the housing 11.

Figure 5:
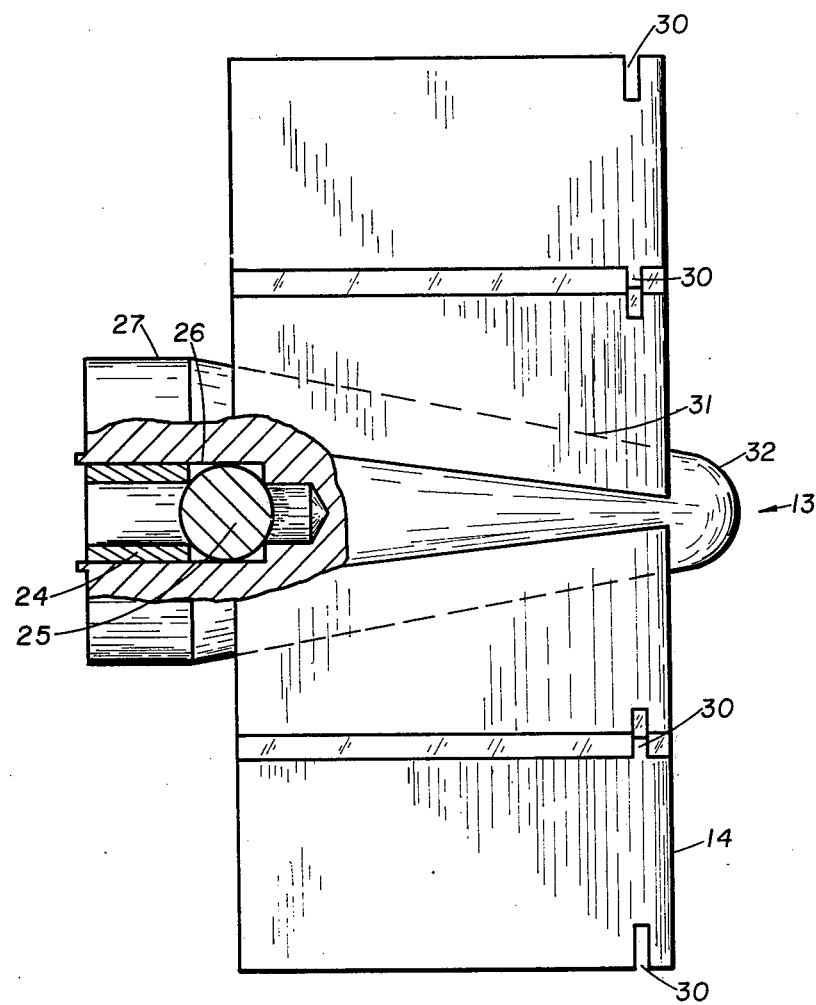
FIG. 5 is a side view of a flow straightening device shown in cross-section in FIG. 2 having the bearing section shown in cross-section.

Referring to FIG. 5, a flow straightening means 13 is shown. Each vane 14 is formed with a slot 30 into which the tab 15 extends when the flow straightening means 13 is assembled in the housing 11. Although each vane 14 is shown having a slot 30, the flow straightening means 13 may be formed with only one vane having a slot 30 or any desired number of vanes 14 having slots 30.

Although the central body portion 31 of the flow straightening means 13 has been shown as having the central body portion 31 formed with the rotor end 27 tapering to a reduced diameter nose end 32, the central portion 31 may be any desired shape which is not disruptive to the fluid flow thereover.

To assemble the turbine flow meter 10, a housing 11 has a flow straightening means 13 inserted therein with the slots 30 being aligned with the annular groove 20 or arcuate shaped slots 20'. After insertion of the flow straightening means 13 into the housing 11, a clip 15 having either portion 15b or 15c deformed with respect to the central portion 15a, preferably at a 90° angle thereto, is inserted into the recess formed by the slot 30 in the end of a vane 14 of the flow straightening means 13 being aligned with the annular groove 20 or arcuate shaped slots 20' in the housing 11 with the central portion 15a of the clip 15 filling the recess formed by the slot 30 and annular groove 20 or arcuate recess 20' with the deformed portion, either 15b or 15c, of the clip 15 abutting the side of the vane 14. After the insertion of the clip 15, having either portion 15b or 15c previously deformed at a 90° angle to the central portion 15a, into the recess formed by the slot 30 in the end of a vane 14 and an annular groove 20 or arcuate recess 20', the remaining portion of the clip 15 is deformed into engagement with the side of the vane 14 or at least deformed to parallel the side of vane 14. If at this time the previously deformed portion 15b or 15c of the clip 15 is not engaging or paralleling the side of vane 14 of the flow straightening means 13, it is deformed to engage or parallel the side of the vane 14. At this point, the clip installation process may be repeated until any desired number of clips have been installed with the limiting factor being either the number of vanes 14 on the flow straightening means 13 or the number of arcuate recesses 20' in the housing 11, forming the necessary recesses for the clip insertion process.

After one flow straightening means 13 has been installed in the housing 11, the rotor 12 is installed in the housing 11 with one end of the rotor shaft 23 inserted into bearing 24 in the rotor end 27 of the flow straightening means 13. At this time, the second flow straightening means 13 is installed in the housing 11 with the other end of the rotor shaft 23 being installed in the bearing 24 of the rotor end 27 of the flow straightening means 13.

The slots 30 in the vanes 14 of the flow straightening means 13 are subsequently aligned with the annular groove 20 or arcuate recesses 20' in the housing body 11.

At this point, the rotor 12 and the flow straightening means 13 are separately rotated to establish the orientation of the flow straightening means 13 with respect to the rotor 12 that will cause the least rotational drag on the rotor 12. After the minimum drag orientation for the rotor 12 has been established, the desired number of clips 15 are installed in the recesses formed by the slots 30 being aligned with the annular groove 20 or plurality of arcuate recesses 20' in the housing 11 by deforming the clips about the vanes 14 of the flow straightening means 13 thereby securing the flow straightening means 13 in the housing 11.

Alternatively, the rotor 12 may be assembled with the flow straightening means 13 before the insertion thereof in the housing 11. If this occurs, the method of assembling the turbine flow meter 10 is altered only to the extend that the flow straightening means 13 and the rotor 12 are not individually inserted into the housing 11. Although preassembled as a unit before the installation in the housing 11, the flow straightening means 13 and rotor 12 must be aligned and separately rotated to establish the minimum drag configuration for the rotor 12 in the housing 11.

It should be further understood that the electrical piclup 28 may be installed at any time during the turbine flow meter assembly process.

It should also be further understood that although the flow meter assembly procedure has been described with respect to the installation of the clip 15 having either a portion 15 or 15c previously deformed before the assembly of the clip 15 in the recess formed by the annular groove 20 or arcuate recess 20' and the slot 30 in the straightening vane 14, the clip 15 can be installed in the recess without any prior deformation and subsequently have both portions 15 and 15c deformed into engagement or parallel to the sides of straightening vane 14, although this is a more difficult assembly procedure.

It should be noted that although the invention has been described with respect to installing a flow straightening means 13 in a turbine flow meter 10, the invention can be used to install any type flow straightening means, such as axial straightening vanes or flow directing vanes in any type flow device, such as a rectangular or other cross sectional-shape flow duct. Alternatively, the invention could be used as a support means for any object within a housing in a wide variety of applications with or without fluid flow being encountered.

While the invention has been described with reference to preferred and alternative embodiments, it will be appreciated by those skilled in the art that additions, deletions, modifications and substitutions, or other changes not specifically described may be made which fall within the purview of the appended claims.

What is claimed as new and desired to be secured by Letters Patent is:

1. A fluid flow straightening device comprising:
   a hollow housing having a recessed area extending about a portion of the interior surface of said hollow housing and through only a portion of the thickness of said hollow housing;
   fluid flow straightening means having a recessed area in the exterior surface of said fluid flow straightening means; and
   fastening means having a portion inserted in the area formed when said recessed area in said hollow housing and said recessed area in said fluid flow straightening means are aligned while the remaining portion of said fastening means substantially conforms to said exterior surface of said fluid flow straightening means thereby preventing both longitudinal and rotational movement of said fluid flow straightening means in said hollow housing.

2. The apparatus of claim 1 wherein said recessed area in said hollow housing comprises an arcuate shaped recess located in an end portion of said hollow housing.

3. The apparatus of claim 1 wherein said fluid flow straightening means further comprises:
   a central member; and
   a plurality of vanes, each of said vanes having one end attached to said central member and extending radially from said central member while the other end of each of said vanes terminates adjacent said interior surface of said hollow housing.

4. The apparatus of claim 3 wherein said recessed area in said exterior surface of said fluid flow straightening means comprises a slot located in said other end of one of said vanes.

5. The apparatus of claim 4 wherein each of said vanes contains a slot in said other end.

6. The apparatus of claim 1 wherein:
   said recessed area in said hollow housing comprises an arcuate shaped recess; and
   said fluid flow straightening means further comprises a central member and a plurality of vanes, each of said vanes having one end attached to said central member and extending radially from said central member while the other end of each of said vanes terminates adjacent said interior surface of said hollow housing.

7. The apparatus of claim 6 wherein:
   a plurality of recesses are located in an end portion of said hollow housing; and
   a plurality of recessed areas are located in said exterior surface of said flow straightening means, each of said recessed areas comprising a slot located in said other end of each of said vanes.

8. The apparatus of claim 7 further comprising:
   a plurality of said fastening means equal to the number of areas formed when said plurality of arcuated shaped recesses in said hollow housing are aligned with said slots in said vanes.

9. A fluid flow measuring device comprising:
   a hollow housing having a recessed area extending about a portion of the interior surface of said housing and through only a portion of the thickness of said hollow housing;
   fluid flow straightening means having a recessed area in the exterior surface of said fluid flow straightening means;
   fastening means having a portion inserted in the area formed when said recessed area in said hollow housing and said recessed area in said fluid flow straightening means are aligned while the remaining portion of said fastening means substantially conforms to said exterior surface of said fluid flow straightening means thereby fastening said fluid flow straightening means to said hollow housing; and
   means for measuring the flow of fluid through said housing.

10. The apparatus of claim 9 wherein:
    said recessed area in said hollow housing comprises an arcuate shaped recess;
    said fluid flow straightening means further comprises a central member and a plurality of vanes, each of said vanes having one end attached to said central member and extending radially from said central member while the other end of each of said vanes terminates adjacent said interior surface of said hollow housing; and
    said means for measuring the fluid flow through said hollow housing comprises a rotatable ferromagnetic member and an electrical pickup means.

11. The apparatus of claim 10 wherein:
    a plurality of arcuate shaped recesses are located in an end portion of said hollow housing; and
    a plurality of recessed areas are located in said exterior surface of said fluid flow straightening means, each of said recessed areas comprising a slot located in said other end of each of said vanes.

12. The apparatus of claim 11 further comprising:
    a plurality of said fastening means equal to the number of areas formed when said plurality of arcuate shaped recesses in said hollow housing are aligned with said slots in said vanes.

13. A method of assembling a fluid flow straightening means comprising the steps of:
    inserting a fluid flow straightening means in a hollow housing;
    aligning a recessed area extending about a portion of the interior surface of said hollow housing with a recessed area in the exterior surface of said fluid flow straightening means;
    inserting a portion of a fastening means in the area formed when said recessed area in said hollow housing and said recessed area in said flow straightening means are aligned; and
    deforming the remaining portion of said fastening means to substantially conform to said interior surface of said fluid flow straightening means thereby fastening said fluid flow straightening means to said hollow housing.

14. The method of claim 13 wherein:
    said recessed area in said hollow housing comprises an arcuate shaped recess; and said fluid flow straightening means comprises a central member and a plurality of vanes, each of said vanes having one end attached to said central member and extending radially from said central member while the other end of each of said vanes terminates adjacent said interior surface of said hollow housing.

15. The method of claim 14 wherein:
    a plurality of said arcuate shaped recesses are located in an end portion of said hollow housing; and a plurality of said recessed areas are located in said exterior surface of said fluid flow straightening means, each of said recessed areas comprising a slot located in said other end of each of said vanes.

16. The method of claim 15 further comprising the steps of:
providing a plurality of said fastening means; and
repeating said inserting step and said deforming step a plurality of times equal to the number of areas formed when said arcuate shaped recesses in said hollow housing and said recesses in said fluid flow straightening means are aligned thereby fastening said fluid flow means to said hollow housing utilizing a plurality of fastening means.

17. A method of assembling a fluid flow measuring device comprising the steps of:
(a) inserting a first fluid flow straightening means into a cylindrical housing;
(b) aligning a recessed area extending about a portion of the interior surface of said cylindrical housing with a recessed area in the exterior surface of said first fluid flow straightening means;
(c) inserting a portion of a fastening means in the area formed when said recessed area in said cylindrical housing and said recessed area in said exterior surface of said first fluid flow straightening means are aligned;
(d) deforming the remaining portion of said fastening means to substantially conform to said exterior surface of said first fluid flow straightening means thereby fastening said first fluid flow straightening means to said cylindrical housing;
(e) inserting a rotatable member into said cylindrical member;
(f) inserting a second fluid flow straightening means into said cylindrical housing;
(g) aligning a recessed area extending about a portion of the interior surface of said cylindrical housing with a recessed area in the exterior surface of said second fluid flow straightening means;
(h) inserting a portion of a fastening means in the area formed when said recessed area in said cylindrical housing and said recessed area in said exterior surface of said second fluid flow straightening means are aligned; and
(i) deforming the remaining portion of said fastening means to substantially conform to said exterior surface of said second fluid flow straightening means thereby fastening said second fluid flow straightening means to said cylindrical housing.

18. The method of claim 17 wherein:
said first and second fluid flow straightening means comprises a central member and a plurality of vanes, each of said vanes having one end attached to said central member and extending radially from said central member while the other end of each of said vanes terminates adjacent said interior surface of said cylindrical housing.

19. The method of claim 18 wherein:
a plurality of said recessed areas are located in said exterior surface of said first and second fluid flow straightening means, each of said recessed areas comprising a slot located in said other end of each of said vanes.

20. The method of claim 19 further comprising the step of:
subsequent to step (h) but prior to step (i) rotating said second fluid flow straightening means to a position where said rotatable member rotates in said cylindrical housing with the least drag on said rotatable member.

21. The method of claim 20 further comprising the steps of:
providing a plurality of fastening means; and
repeating steps (c), (d), (h) and (i) a plurality of times equal to the number of areas formed when said plurality of said arcuate shaped recesses in said cylindrical housing and said recesses in said first and second fluid flow straightening means are aligned thereby fastening said first and second fluid flow means to said cylindrical housing utilizing a plurality of fastening means.

22. A fluid flow straightening device comprising:
a hollow housing having a recessed area extending about the interior surface of said hollow housing and through only a portion of the thickness of said hollow housing;
fluid flow straightening means having a recessed area in the exterior surface of said fluid flow straightening means; and
fastening means having a portion inserted in the area formed when said recessed area in said hollow housing and said recessed area in said fluid flow straightening means are aligned while the remaining portion of said fastening means substantially conforms to said exterior surface of said fluid flow straightening means thereby preventing longitudinal movement of said fluid flow straightening means in said hollow housing.

23. The apparatus of claim 22 wherein said fluid flow straightening means further comprising:
a central member; and
a plurality of vanes, each of said vanes having one end attached to said central member and extending radially from said central member while the other end of each of said vanes terminates adjacent said interior surface of said hollow housing.

24. The apparatus of claim 23 wherein said recessed area in said exterior surface of said fluid flow straightening means comprises a slot located in said other end of one of said vanes.

25. The apparatus of claim 24 wherein each of said vanes contains a slot in said other end.

26. The apparatus of claim 25 further comprising:
a plurality of said fastening means equal to the number of said slots in said vanes.

27. A fluid flow measuring device comprising:
a hollow housing having a recessed area extending about the interior surface of said hollow housing and through only a portion of the thickness of said hollow housing;
fluid flow straightening means having a recessed area in the exterior surface of said fluid flow straightening means;
fastening means having a portion inserted in the area formed when said recessed area in said hollow housing and said recessed area in said fluid flow straightening means are aligned while the remaining portion of said fastening means substantially conforms to said exterior surface of said fluid flow straightening means thereby fastening said fluid flow straightening means to said hollow housing; and
means for measuring the flow of fluid through said hollow housing.

28. The apparatus of claim 27 wherein:

said fluid flow straightening means further comprises a central member and a plurality of vanes, each of said vanes having one end attached to said central member and extending radially from said central member while the other end of each of said vanes terminates adjacent said interior surface of said hollow housing and has a slot therein; and said means for measuring the fluid flow through said hollow housing comprises a rotatable ferromagnetic member and an electrical pickup means.

29. The apparatus of claim 28 further comprising:
a plurality of said fastening means.

30. A method of assembling a fluid flow straightening means comprising the steps of:
inserting a fluid flow straightening means in a hollow housing;
aligning a recessed area extending about the interior surface of said hollow housing with a recessed area in the exterior surface of said fluid flow straightening means;
inserting a portion of a fastening means in the area formed when said recessed area in said hollow housing and said recessed area in said flow straightening means are aligned; and
deforming the remaining portion of said fastening means to substantially conform to said interior surface of said fluid flow straightening means thereby fastening said fluid flow straightening means to said hollow housing.

31. The method of claim 30 wherein:
a plurality of said recessed areas are located in said exterior surface of said fluid flow straightening means, each of said recessed areas comprising a slot located in said other end of each of said vanes.

32. The method of claim 31 further comprising the steps of:
providing a plurality of said fastening means; and
repeating said inserting step and said deforming step a plurality of times equal to the number of areas formed when said recess in said hollow housing and said slots in said fluid flow straightening means are aligned thereby fastening said fluid flow means to said hollow housing utilizing a plurality of fastening means.

33. A method of assembling a fluid flow measuring device comprising the steps of:
(a) inserting a first fluid flow straightening means into a cylindrical housing;
(b) aligning a recessed area extending about the interior surface of said cylindrical housing with a recessed area in the exterior surface of said first fluid flow straightening means;
(c) inserting a portion of a fastening means in the area formed when said recessed area in said cylindrical housing and said recessed area in said exterior surface of said first fluid flow straightening means are aligned;
(d) deforming the remaining portion of said fastening means to substantially conform to said exterior surface of said first fluid flow straightening means thereby fastening said first fluid flow straightening means to said cylindrical housing;
(e) inserting a rotatable member into said cylindrical member;
(f) inserting a second fluid flow straightening means into said cylindrical housing;
(g) aligning a recessed area extending about a portion of the interior surface of said cylindrical housing with a recessed area in the exterior surface of said second fluid flow straightening means;
(h) inserting a portion of a fastening means in the area formed when said recessed area in said cylindrical housing and said recessed area in said exterior surface of said second fluid flow straightening means are aligned; and
(i) deforming the remaining portion of said fastening means to substantially conform to said exterior surface of said second fluid flow straightening means thereby fastening said second fluid flow straightening means to said cylindrical housing.

34. The method of claim 33 wherein:
said fluid flow straightening means comprises a central member and a plurality of vanes, each of said vanes having one end attached to said central member and extending radially from said central member while the other end of each of said vanes terminates adjacent said interior surface of said cylindrical housing.

35. The method of claim 34 wherein:
a plurality of said recessed areas are located in said exterior surface of said fluid flow straightening means, each of said recessed areas comprising a slot located in said other end of each of said vanes.

36. The method of claim 35 further comprising the steps of:
subsequent to step (h) but prior to step (i) rotating said fluid flow straightening means to a position where said rotable member rotates in said cylindrical housing with the least drag on said rotatable member.

37. The method of claim 36 further comprising the steps of:
providing a plurality of fastening means; and
repeating steps (c), (d), (h) and (i) a plurality of times equal to the number of areas formed when said recess in said cylindrical housing and said slots in said fluid flow straightening means are aligned thereby fastening said fluid flow means to said cylindrical housing utilizing a plurality of fastening means.

* * * * *